US010076899B2

(12) United States Patent
Aston et al.

(10) Patent No.: US 10,076,899 B2
(45) Date of Patent: Sep. 18, 2018

(54) METHOD OF MANUFACTURING A SPIRAL LAMINATED STRUCTURAL CONE

(71) Applicant: The Boeing Company, Chicago, IL (US)

(72) Inventors: Richard W. Aston, Brea, CA (US); Brett T. Cope, Long Beach, CA (US); Andrew R. Streett, San Clemente, CA (US)

(73) Assignee: The Boeing Company, Chicago, IL (US)

( * ) Notice: Subject to any disclaimer, the term of this patent is extended or adjusted under 35 U.S.C. 154(b) by 371 days.

(21) Appl. No.: 14/949,224

(22) Filed: Nov. 23, 2015

(65) Prior Publication Data
US 2016/0075125 A1    Mar. 17, 2016

Related U.S. Application Data

(62) Division of application No. 13/770,330, filed on Feb. 19, 2013, now Pat. No. 9,205,625.

(51) Int. Cl.
*B32B 5/12* (2006.01)
*B32B 38/18* (2006.01)
(Continued)

(52) U.S. Cl.
CPC .......... *B32B 38/1808* (2013.01); *B29C 65/02* (2013.01); *B29C 66/432* (2013.01);
(Continued)

(58) Field of Classification Search
CPC . B29C 70/06; B29C 66/432; B29K 2105/256; B32B 2250/20; B64G 1/22
(Continued)

(56) References Cited

U.S. PATENT DOCUMENTS 4,671,837 A    6/1987    Stewart
6,162,314 A *  12/2000   Kassuelke ............... B29C 65/02
                                                    156/182
(Continued)

FOREIGN PATENT DOCUMENTS

EP    0703144       1/2000
JP    S56159156 A   12/1981
(Continued)

OTHER PUBLICATIONS

Japanese Office Action dated Dec. 1, 2015 for Japanese Application No. 2014-023024.
Niu, "Composite Airframe Structures," Jan. 1992.

*Primary Examiner* — Scott W Dodds

(57) ABSTRACT

A method of manufacturing a cone-shaped composite article may include providing unidirectional plies in a continuous arcuate shape in a flat pattern configured to wrap 360 degrees around a cone-shaped mandrel such that opposing ply ends of each unidirectional ply terminate at a ply seam. The method may further include laying up at least one inner sublaminate on the cone-shaped mandrel, the inner sublaminate containing at least four of the unidirectional plies having an inner stacking sequence with fiber angles of −45, 90, 0, +45 degrees such that the inner sublaminate has a quasi-isotropic layup at any location of the inner sublaminate. The method may additionally include laying up at least one outer sublaminate in an outer stacking sequence being a mirror image of the at least one inner stacking sequence.

20 Claims, 14 Drawing Sheets

(51) Int. Cl.
    *B32B 5/26*     (2006.01)
    *B32B 1/00*     (2006.01)
    *B32B 3/02*     (2006.01)
    *B64G 1/64*     (2006.01)
    *B29C 65/02*     (2006.01)
    *B29C 65/00*     (2006.01)
    *B32B 37/06*     (2006.01)
    *B32B 37/18*     (2006.01)
    *B64G 1/22*     (2006.01)
    *B29K 105/00*     (2006.01)
    *B29L 9/00*     (2006.01)
    *B29L 31/30*     (2006.01)

(52) U.S. Cl.
CPC .................. *B32B 1/00* (2013.01); *B32B 3/02* (2013.01); *B32B 5/12* (2013.01); *B32B 5/26* (2013.01); *B32B 37/06* (2013.01); *B32B 37/182* (2013.01); *B64G 1/22* (2013.01); *B64G 1/641* (2013.01); *B29K 2105/256* (2013.01); *B29L 2009/00* (2013.01); *B29L 2031/3097* (2013.01); *B32B 2250/20* (2013.01); *B32B 2262/02* (2013.01); *B32B 2307/306* (2013.01); *B32B 2307/308* (2013.01); *B32B 2307/734* (2013.01); *B32B 2605/00* (2013.01); *Y10T 156/10* (2015.01); *Y10T 428/192* (2015.01)

(58) Field of Classification Search
USPC .................................................. 264/158, 258
See application file for complete search history.

(56) References Cited

U.S. PATENT DOCUMENTS

| | | |
|---|---|---|
| 7,243,055 B2 | 7/2007 | Chen et al. |
| 8,246,882 B2 | 8/2012 | Tsotsis |
| 8,263,205 B2 | 9/2012 | Kweder |
| 2005/0035187 A1 | 2/2005 | Rea |
| 2011/0064908 A1 | 3/2011 | Kweder |
| 2012/0308766 A1 | 12/2012 | Kweder |

FOREIGN PATENT DOCUMENTS

| | | |
|---|---|---|
| JP | H02169633 | 6/1990 |
| JP | H04267139 | 9/1992 |
| JP | 2003118038 | 4/2003 |
| WO | WO8901126 | 2/1989 |

* cited by examiner

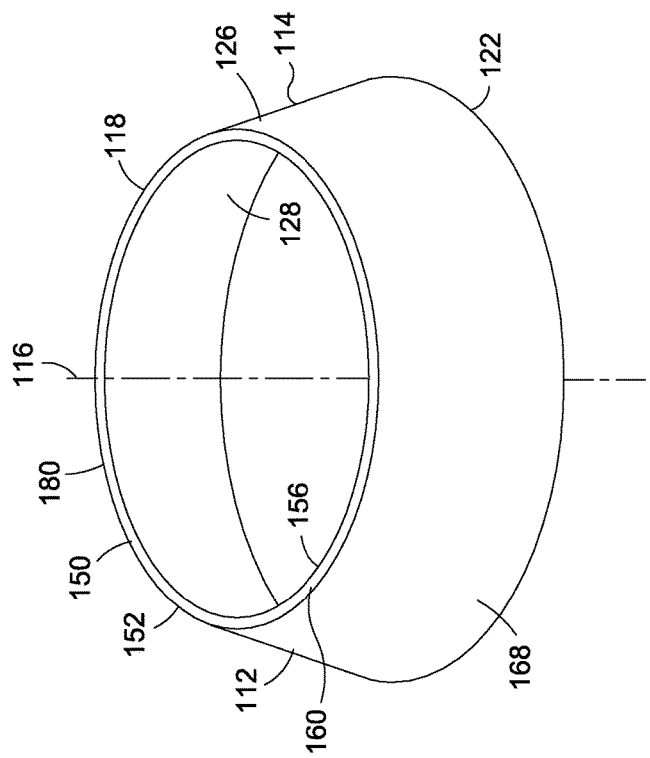
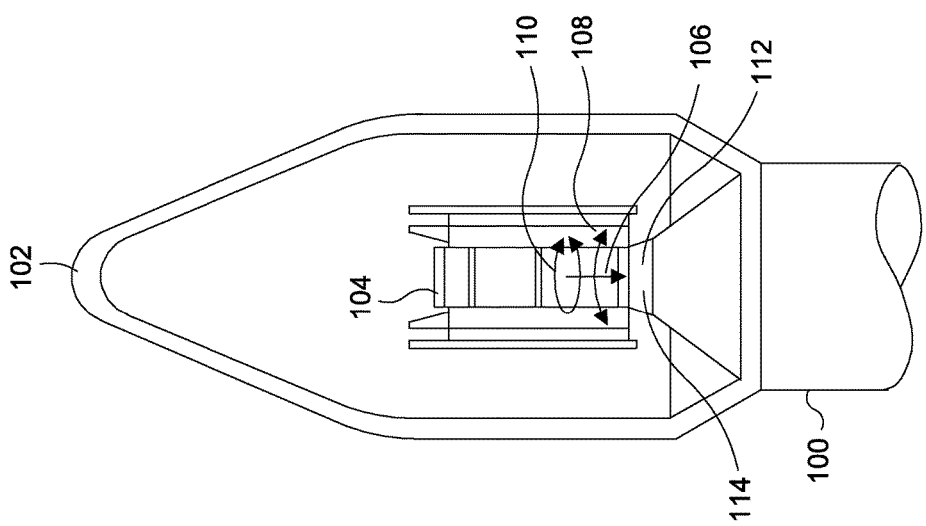

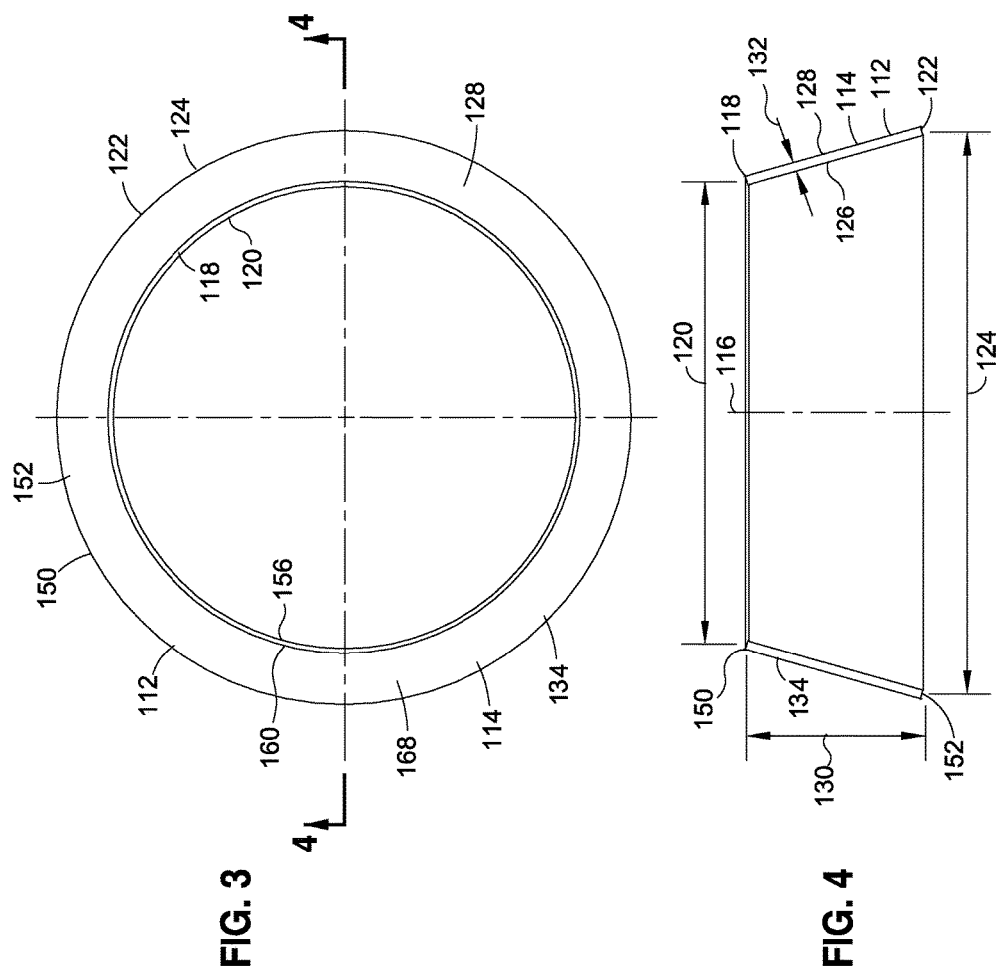

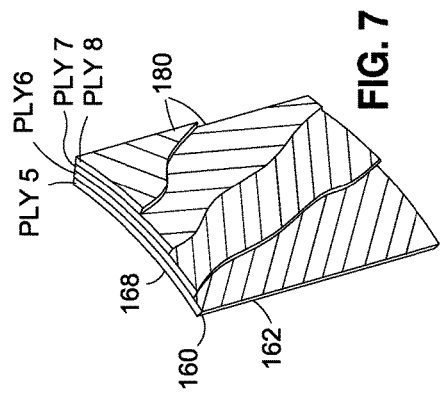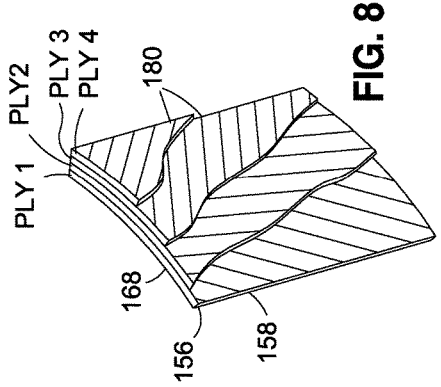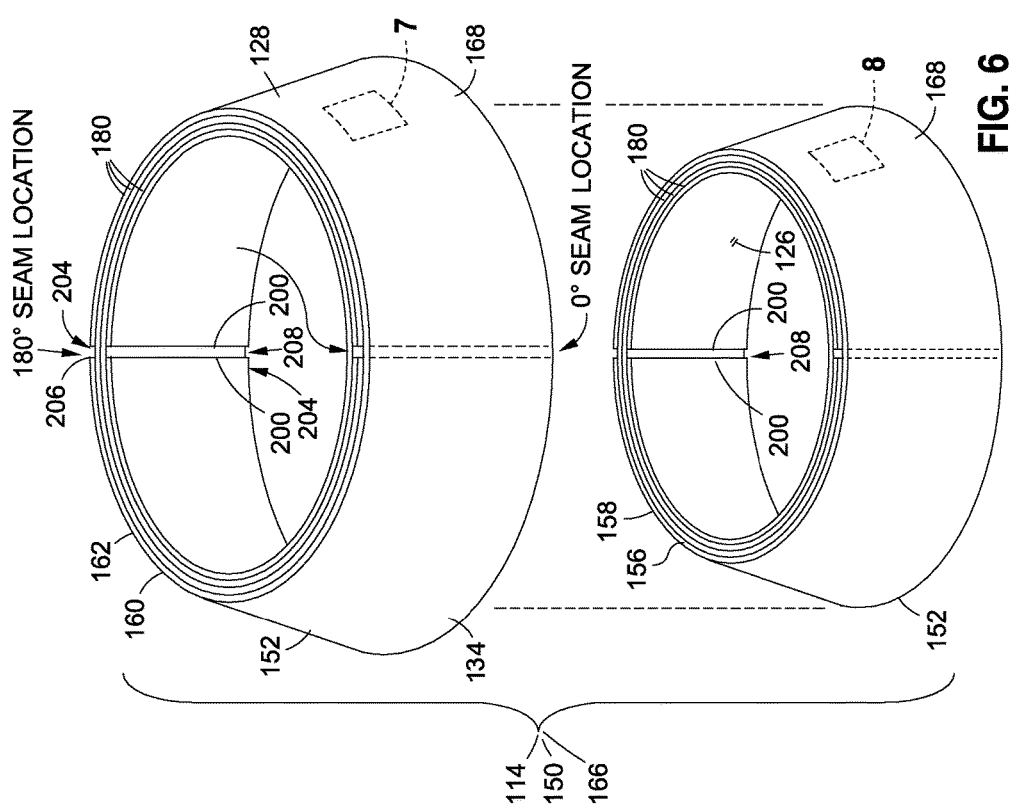

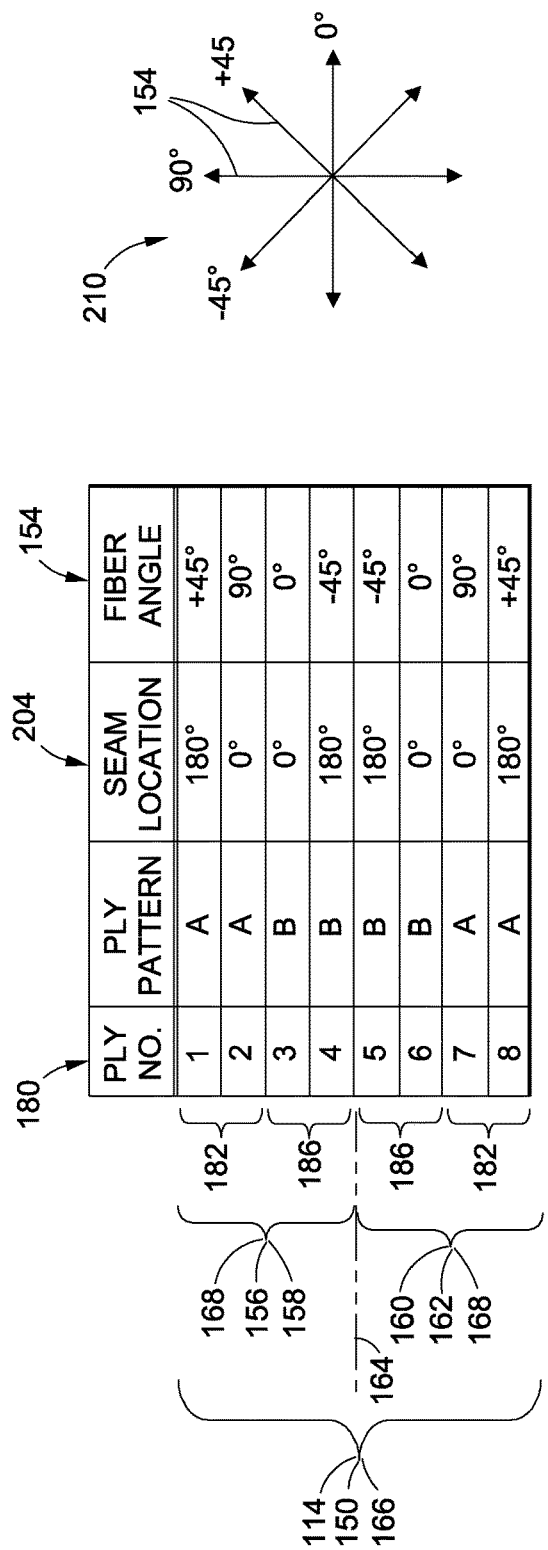

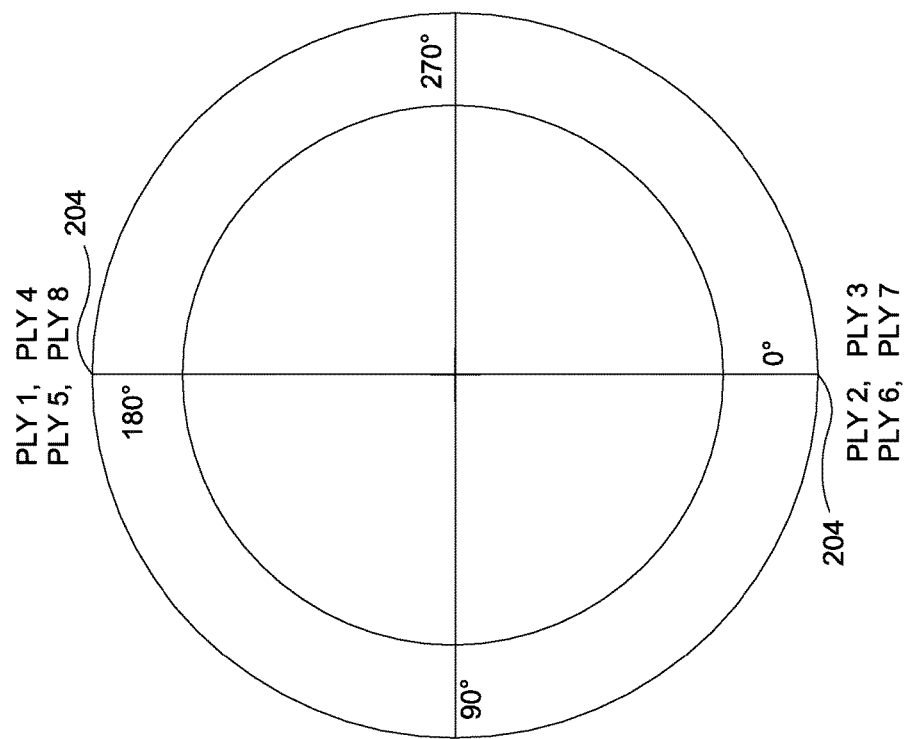

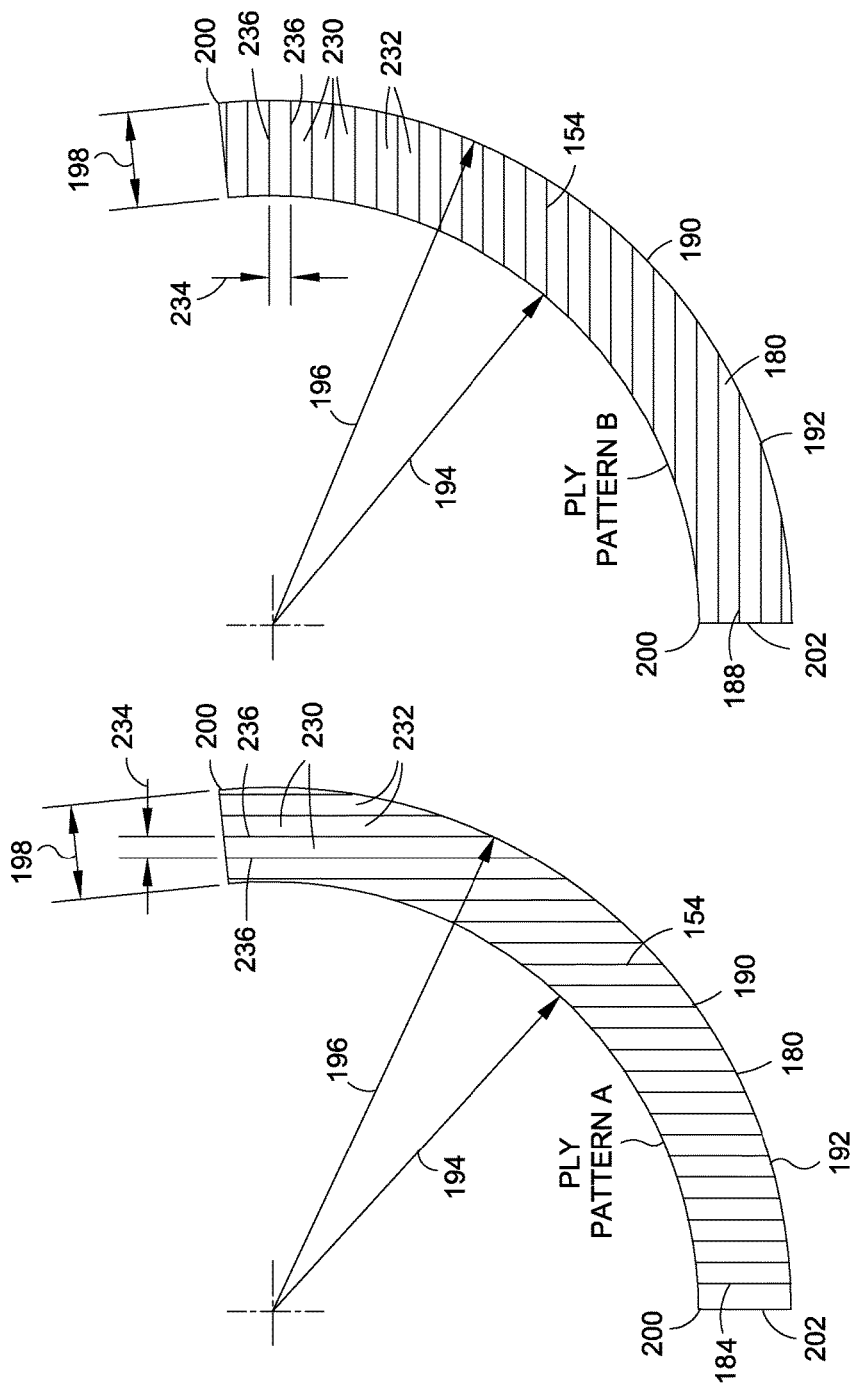

| PLY NO. | PLY PATTERN | SEAM LOCATION | FIBER ANGLE |
|---|---|---|---|
| 1 | A | 180° | +45° |
| 2 | C | -- | GLOBAL 0° |
| 3 | C | -- | GLOBAL 0° |
| 4 | A | 0° | 90° |
| 5 | B | 0° | 0° |
| 6 | C | -- | GLOBAL 0° |
| 7 | B | 180° | -45° |
| 8 | C | -- | GLOBAL 0° |
| 9 | A | 315° | +45° |
| 10 | A | 135° | 90° |
| 11 | B | 135° | 0° |
| 12 | B | 315° | -45° |
| 13 | A | 225° | +45° |
| 14 | A | 45° | 90° |
| 15 | B | 45° | 0° |
| 16 | B | 225° | -45° |
| 17 | B | 225° | -45° |
| 18 | B | 45° | 0° |
| 19 | A | 45° | 90° |
| 20 | A | 225° | +45° |
| 21 | B | 315° | -45° |
| 22 | A | 135° | 0° |
| 23 | A | 135° | 90° |
| 24 | A | 315° | +45° |
| 25 | C | -- | GLOBAL 0° |
| 26 | B | 180° | -45° |
| 27 | C | -- | GLOBAL 0° |
| 28 | B | 0° | 0° |
| 29 | A | 0° | 90° |
| 30 | C | -- | GLOBAL 0° |
| 31 | C | -- | GLOBAL 0° |
| 32 | A | 180° | +45° |

METHOD OF MANUFACTURING A SPIRAL LAMINATED STRUCTURAL CONE

CROSS-REFERENCE TO RELATED APPLICATIONS

The present application is a divisional application of and claims priority to pending U.S. application Ser. No. 13/770,330 filed on Feb. 19, 2013, and entitled SPIRAL LAMINATED STRUCTURAL CONE AND MANUFACTURING METHOD, the entire contents of which is expressly incorporated by reference herein.

FIELD

The present disclosure relates generally to composite articles and, more particularly, to cone-shaped articles formed of laminated composite material.

BACKGROUND

Spacecraft such as communications satellites are typically launched into orbit using a launch vehicle, and are typically encapsulated within a fairing mounted on top of the launch vehicle. The fairing protects the spacecraft from the elements as the launch vehicle ascends through the atmosphere. The spacecraft may be coupled to the launch vehicle with a cone-shaped payload attach fitting. The payload attach fitting must be capable of transmitting axial loads, bending loads and torsional loads from the spacecraft into the launch vehicle. Axial loads on the payload attach fitting can be significant during lift-off of the launch vehicle. Bending loads on the payload attach fitting can be relatively high as a result of aerodynamic turbulence acting on the launch vehicle at relatively high altitudes.

Composite materials may be used to fabricate low-weight, high-strength structures or articles such as for a payload attach fitting for coupling a spacecraft loads to a launch vehicle. Unfortunately, conventional methods of fabricating cone-shaped composite structures may require the use of darting of the individual composite plies so that the composite plies will conform to the structure geometry. In addition, conventional methods of fabricating cone-shaped composite structures may require the use of overlap splicing of the composite plies so that the composite plies will conform to the structure geometry. The use of darting and overlap splicing in the composite plies adds to the weight of the composite structure. In addition, the darting and overlap splicing of composite plies increases the risk of the occurrence of voids or wrinkles in the composite structure which may compromise the strength characteristics of the composite structure.

As can be seen, there exists a need in the art for a cone-shaped composite article that may be fabricated without the need for darts or splices and which can be produced in a relatively high strength. Furthermore, there exists a need in the art for a relatively light weight and high-strength cone-shaped composite article capable of transmitting a variety of loads of different direction and magnitude.

SUMMARY

The above-noted needs associated with composite articles are specifically addressed and alleviated by the present disclosure which provides a cone-shaped composite article including an inner sublaminate containing four unidirectional plies having an inner stacking sequence with fiber angles of 0, 90, +45, and −45 degrees such that the inner laminate has a quasi-isotropic layup pattern at any location on the inner laminate. The cone-shaped composite article may also include an outer sublaminate containing four unidirectional plies having an outer stacking sequence that is a mirror image of the inner stacking sequence. Each one of the unidirectional plies may be continuous along a ply arclength wrapping 360 degrees around the cone-shaped composite article and may have opposing ply ends terminating at a ply seam.

In a further embodiment, disclosed is cone-shaped composite article including an inner sublaminate having a cone shape and containing four unidirectional plies having an inner stacking sequence with fiber angles of 0, 90, +45, and −45 degrees such that the inner laminate has a quasi-isotropic layup at any location on the inner laminate. The cone-shaped composite article may also include an outer sublaminate having an outer stacking sequence that is a mirror image of the inner stacking sequence. Each one of the unidirectional plies may be continuous along a ply arclength wrapping 360 degrees around the cone-shaped composite article and having opposing ply ends terminating at a ply seam. Furthermore, the cone-shaped composite article may also include at least one global axial ply laminated with the inner sublaminate and the outer sublaminate. The global axial ply may include a plurality of axial ply wedges arranged in side-by-side relation and extending 360 degrees around the cone-shaped composite article. Each axial ply wedge may have a fiber angle that may be generally aligned with a longitudinal axis of the cone-shaped composite article.

Also disclosed is a method of manufacturing a cone-shaped composite article. The method may include the step of providing unidirectional plies in a continuous arcuate shape in a flat pattern configured to wrap 360 degrees around a cone-shaped mandrel such that opposing ply ends of each unidirectional ply terminate at a ply seam. The method may further include the step of laying up an inner sublaminate on the cone-shaped mandrel. The inner sublaminate may contain four of the unidirectional plies having an inner stacking sequence with fiber angles of 0, 90, +45, and −45 degrees such that the inner laminate has a quasi-isotropic layup at any location of the inner laminate. The method may also include laying up an outer sublaminate in an outer stacking sequence that is a mirror image of the inner stacking sequence.

It should be noted that the four unidirectional plies in a sublaminate may be arranged in any order and are not limited to being arranged in the 0/90/+45/−45 order indicated above. In this regard, the four unidirectional plies in each sublaminate may be arranged in any order containing at least a 0-degree ply, a 90-degree ply, a +45-degree ply, and a −45-degree ply to form a quasi-isotropic layup on one side of a through-thickness mid-plane (i.e., the thickness centerline), and a mirror image quasi-isotropic sublaminate on an opposite side of the mid-plane containing four unidirectional plies in a mirror-image stacking sequence described below. In addition, a composite laminate may be provided with multiple quasi-isotropic sublaminates on one side of the mid-plane and an equal number of quasi-isotropic sublaminates on an opposite side of the mid-plane to form a balanced and symmetric layup as described below. The composite laminate is balanced in the sense that each negative fiber-angle ply (e.g., a −45-degree ply) is balanced by a corresponding positive fiber-angle ply (e.g., a +45-degree ply). The composite laminate is symmetric in the sense that the plies on one side of the mid-plane are a mirror image of the plies on an opposite side of the mid-plane and are located at the same distances from the mid-plane.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a cross-sectional illustration of a spacecraft encapsulated within a launch vehicle and illustrating a cone-shaped composite article coupling the spacecraft to the launch vehicle;

FIG. 2 is a perspective illustration of the cone-shaped composite article;

FIG. 3 is a top view of the cone-shaped composite article;

FIG. 4 is a sectional view of the cone-shaped composite article taken along line 4 of FIG. 3;

FIG. 6 is an exploded schematic perspective illustration of the inner sublaminate and outer sublaminate for the embodiment of the of the cone-shaped composite article shown in FIG. 5;

FIG. 7 is a schematic illustration of a portion of the outer stacking sequence of the outer sublaminate shown in FIG. 6 and illustrating a quasi-isotropic layup pattern;

FIG. 8 is a schematic illustration of a portion of the inner stacking sequence of the inner sublaminate shown in FIG. 6 and illustrating the quasi-isotropic layup pattern that is a mirror-image of the quasi-isotropic layup pattern of the outer stacking sequence of FIG. 7;

FIG. 9 is a chart of a ply stacking sequence of an embodiment of the cone-shaped composite article shown in FIGS. 5-6;

FIG. 10 is a fiber angle rosette illustrating the sign convention for the fiber angles in the quasi-isotropic layup pattern;

FIG. 12 is a diagrammatic view of the seam locations of the unidirectional plies for the cone-shaped composite article represented by the chart of FIG. 9;

FIG. 13 is an illustration of ply pattern A for two of the unidirectional plies that make up the inner sublaminate and the outer sublaminate;

FIG. 14 is an illustration of ply pattern B for two of the unidirectional plies that make up the inner sublaminate and the outer sublaminate and illustrating the fiber angle being oriented at 90 degrees relative to the fiber angle for ply pattern A;

FIG. 15 is a chart of a ply stacking sequence of an embodiment of a cone-shaped composite article having multiple global axial plies and further illustrating the inner and outer stacking sequence in alternative embodiments of the above-mentioned 0/90/+45/−45 stacking sequence;

FIG. 17 is a view looking downwardly at the cone-shaped composite article having global axial plies and illustrating a plurality of axial ply wedges that make up the global axial plies;

FIG. 18 is an illustration of ply pattern C for forming an axial ply wedge;

DETAILED DESCRIPTION

Figure 5:
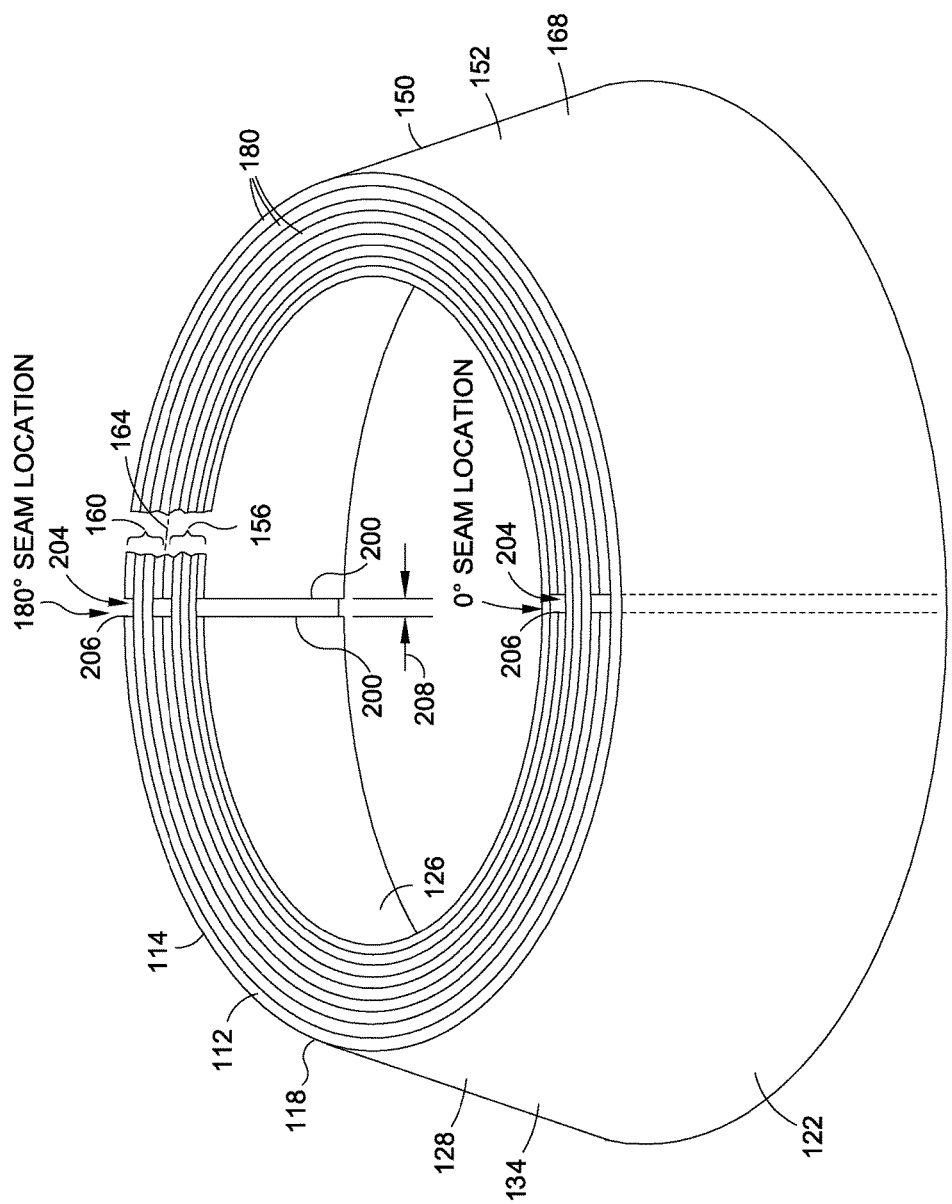
FIG. 5 is a schematic perspective illustration of an inner sublaminate and an outer sublaminate formed of unidirectional plies in an embodiment of the cone-shaped composite article.

Referring now to the drawings wherein the showings are for purposes of illustrating preferred and various embodiments of the disclosure, shown in FIG. 1 is a sectional illustration of a spacecraft 104 encapsulated within a fairing 102 mounted on top of a launch vehicle 100. The spacecraft 104 may be supported by a payload attach fitting 112 which may couple the spacecraft 104 to the launch vehicle 100. The payload attach fitting 112 may be configured as a cone-shaped composite article 114 and may be configured to transmit axial loads 106, bending loads 108, and torsional loads 110 from the spacecraft 104 to the launch vehicle 100.

In FIG. 2, shown is a perspective illustration of the cone-shaped composite article 114 having a longitudinal axis 116 extending vertically through a center thereof. The cone-shaped composite article 114 may include an upper edge 118 and a lower edge 122. Although not shown, a metal ring and mechanical hardware (e.g., separation hardware) may be fastened to the upper edge 118 for coupling the cone-shaped composite article 114 to the spacecraft 104 (FIG. 1). A metal ring and mechanical hardware (e.g., separation hardware) may also be fastened to the lower edge 122 for releasably coupling the cone-shaped composite article 114 to the launch vehicle 100 (FIG. 1). The cone-shaped composite article 114 may be formed as a composite laminate 150 formed of a plurality of composite plies which may be pre-impregnated composite plies. In one example, the plurality of composite plies may comprise a plurality of unidirectional plies 180 which may be pre-impregnated unidirectional plies.

In FIGS. 3-4, shown is a top view and a sectional view of the cone-shaped composite article 114 of FIG. 2. The upper edge 118 may have an upper edge diameter 120 that may be complementary to a diameter of an interface (not shown) with the spacecraft 104 (FIG. 1). The lower edge 122 may have a lower edge diameter 124 that may be complementary to a diameter of an interface (not shown) with the launch vehicle 100 (FIG. 1). In an embodiment of a payload attach fitting 112 (FIG. 1), the cone-shaped composite article 114 may have a cone height 130 (FIG. 4) in the range of from approximately 10 inches to 36 inches or larger, and a half-angle of between approximately 5 degrees to 40 degrees or larger, depending on the interface dimensions at the spacecraft 104 and at the launch vehicle 100.

In FIG. 4, in an embodiment, the upper edge diameter 120 may be in the range of from approximately 12-48 inches or larger, and the lower edge diameter 124 may be in the range of from approximately 18-60 inches or larger. The cone-shaped composite article 114 may have a wall thickness 132 extending between the cone inner surface 126 and the cone outer surface 128. In an embodiment, the wall thickness 132 may be in the range of from approximately 0.10 inch to 1.0 inch or larger, depending on the strength and stiffness requirements for coupling the spacecraft 104 (FIG. 1) to the launch vehicle 100 (FIG. 1). However, the cone-shaped composite article 114 may be provided in any one of a variety of different sizes and configurations, without limitation, and is not limited to the above-noted dimensional ranges.

Figure 19:
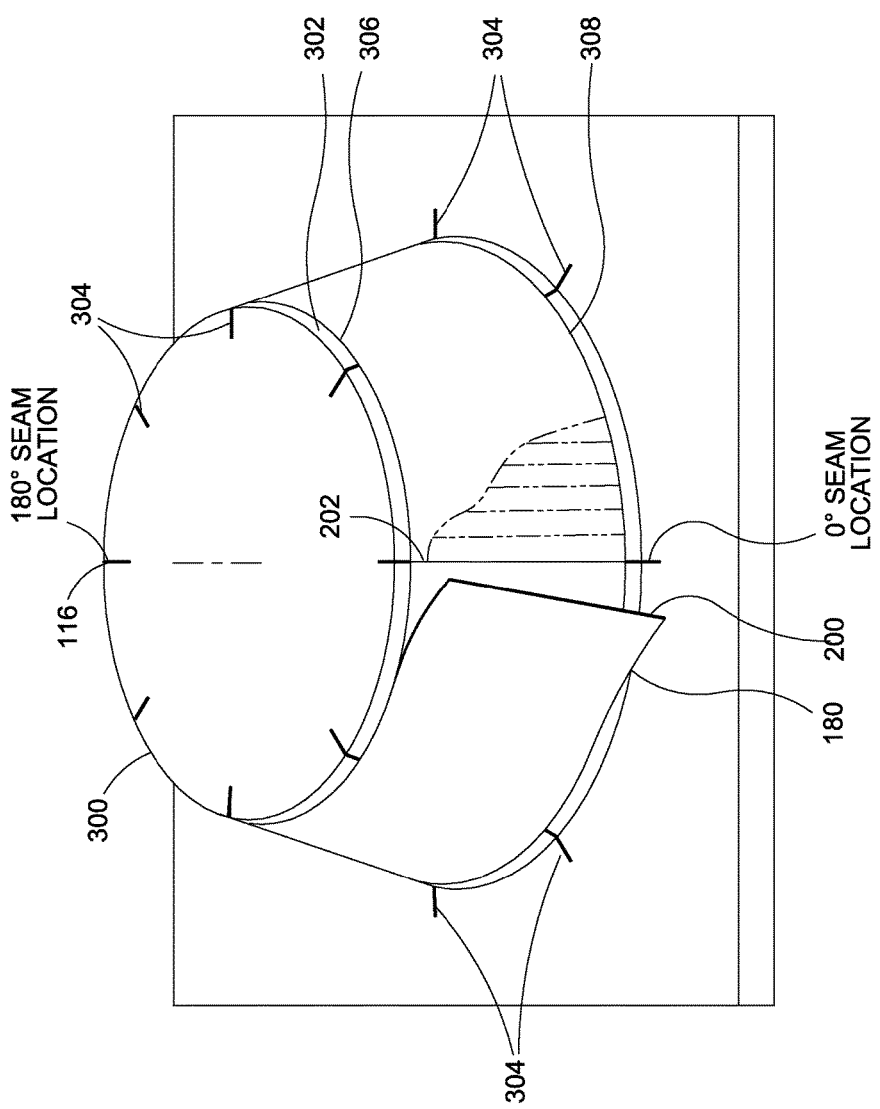
FIG. 19 is a perspective illustration of a cone-shaped mandrel and the layup of a unidirectional ply around a circumference of the mandrel surface.

In FIG. 5, shown is schematic illustration of an embodiment of a solid composite laminate 150 comprising a plurality of unidirectional plies 180 of composite material. The unidirectional plies 180 may be laminated together to form the cone-shaped composite article 114. The composite laminate of the cone-shaped composite article 114 may be fabricated by laying up an initial unidirectional ply 180 on a cone-shaped mandrel 300 (FIG. 19). The local fiber angle 154 (FIG. 9) of the unidirectional ply 180 may continuously change in a spiraling pattern relative to a longitudinal axis 116 (FIG. 4) of the cone-shaped composite article 114. The ply ends 200 of the unidirectional ply 180 may be joined or abutted at a ply seam 204 having a gap 208. The gap 208 is shown exaggerated in FIG. 5 to illustrate a ply butt joint 206 between the ply ends 200. In this regard, the gap 208 in the ply butt joint 206 in any one of the unidirectional plies 180 is preferably less than approximately 0.10 inch between the ply ends 200 although larger gaps 208 are contemplated. In an embodiment, the ply ends may be generally straight such that the ply butt joints 206 form a generally straight line that may be aligned with the longitudinal axis 116 of the cone-shaped composite article 114. However, the ply butt joints 206 may be formed in any shape and are not limited to a straight line configuration that is aligned with the longitudinal axis 116. It should also be noted that although the present disclosure illustrates the ply seams 204 as ply butt joints 206, it is contemplated that the ply ends 200 may be formed as overlap joints (not shown).

In FIG. 5, a second unidirectional ply 180 (e.g., an adjacent unidirectional ply) may be laid up over the initial unidirectional ply 180 with the ply seam 204 of the initial unidirectional ply 180 and the second unidirectional ply 180 being angularly clocked at different locations. For example, the ply seam 204 of the second unidirectional ply 180 may be angularly clocked at 180 degrees relative to the ply seam 204 of the initial unidirectional ply 180 and resulting in a 2-ply laminate having a 0/45 degree layup pattern that spirals around the circumference 134 of the cone-shaped composite article 114. Two additional unidirectional plies 180 may be laid up with local fiber angles oriented 90 degrees relative to the initial two unidirectional plies 180 resulting in a 4-ply sublaminate having a quasi-isotropic layup pattern 168. The orientation of the quasi-isotropic layup pattern 168 continuously changes in a spiraling manner along a circumferential direction of the cone-shaped composite article 114.

In FIG. 5, additional 4-ply quasi-isotropic layup patterns 168 may be added to the composite laminate 150 and clocked at different angles around the circumference 134 of the cone-shaped composite article 114 to provide a composite laminate 150 having the desired strength and stiffness characteristics. As indicated above, such additional 4-ply quasi-isotropic layup patterns 168 are arranged in a balanced layup 166 that is mirrored about a mid-plane 164 of the composite laminate 150. For example, as illustrated in FIG. 15, for each additional inner sublaminate 156, an outer sublaminate 160 is provided on an opposite side of the mid-plane 164 with an outer stacking sequence 162 of the outer sublaminate 160 mirroring (e.g., in reverse order to) the inner stacking sequence 158 of the inner sublaminate 156, although it not necessary that the additional inner sublaminate 156 and outer sublaminate 160 are adjacent to one another, as described in greater detail below. Global axial plies 250 (FIG. 17) may optionally be added to the composite laminate 150 to increase the axial strength and stiffness of the cone-shaped composite article 114 as described below. The system and method disclosed herein advantageously provides for a balanced and symmetric layup which prevents twisting or warping of the composite laminate 150 during processing such as during cool down after curing the composite laminate 150. In addition, the system and method disclosed herein minimizes or eliminates the occurrence of overlap splices which reduces the overall weight of the composite laminate 150, increases structural integrity, and significantly decreases or eliminates the potential for the occurrence of wrinkles in the composite laminate 150 during cure.

In FIG. 6, shown is an exploded schematic illustration of the inner sublaminate 156 and the outer sublaminate 160 which make up an embodiment of the composite laminate 150 of the cone-shaped composite article 114. The inner sublaminate 156 contains four (4) unidirectional plies 180 formed of fiber-reinforced polymer matrix material and having an inner stacking sequence 158 with local fiber angles of 0, 90, −45, and +45 degrees or other combinations of the 4-ply quasi-isotropic layup pattern 168 (e.g., a 0/+45/90/−45 pattern, a +45/0/−45/−90 pattern, a −45/0/+45/90 pattern, and other patterns) as described below. In this regard, the inner stacking sequence 158 of the inner sublaminate 156 advantageously provides a quasi-isotropic layup pattern 168 at any location on the cone shape 152, as mentioned above. The outer sublaminate 160 also contains four (4) unidirectional plies 180 having an outer stacking sequence 162 that is a mirror-image (i.e., in the through-thickness direction) of the inner stacking sequence 158 as described below. In this regard, the outer sublaminate 160 also provides a quasi-isotropic layup pattern 168 at any location on the cone shape 152.

In FIGS. 7-8, shown are portions of the inner sublaminate 156 and outer sublaminate 160 and illustrating the quasi-isotropic layup pattern 168 at any location on the cone shape 152 (FIG. 6). FIG. 7 illustrates the two outermost plies of the outer sublaminate 160 having fiber angles 154 (FIG. 9) that are oriented 90 degrees relative to one another. The two innermost plies of the outer sublaminate 160 have fiber angles 154 that are also oriented 90 degrees relative to one another and 45 degrees relative to the two outermost plies resulting in the quasi-isotropic layup pattern 168. FIG. 8 illustrates the two outermost plies of the inner sublaminate 156 having fiber angles 154 oriented 90 degrees relative to one another and two innermost plies with local fiber angles 154 oriented 90 degrees relative to one another and locally 45 degrees relative to the two outermost plies resulting in the quasi-isotropic layup pattern 168. It can be seen that the fiber angles 154 for the unidirectional plies 180 in FIG. 8 are mirror-images of the fiber angles 154 of the unidirectional plies 180 in FIG. 7.

FIGS. 7-8 illustrate a balanced layup 166 (FIG. 9) provided by the inner sublaminate 156 and the outer sublaminate 160 about the mid-plane 164 (FIG. 6) of the composite laminate 150 (FIG. 6). The mid-plane 164 is located between the outermost unidirectional ply 180 of the inner sublaminate 156 and the innermost unidirectional ply 180 of the outer sublaminate 160, and wherein the mid-plane 164 represents the through-thickness location about which the fiber angles 154 of the inner sublaminate 156 and outer sublaminate 160 are mirror-imaged. In addition, the composite laminate 150 may be arranged such that the unidirectional plies 180 are symmetric about the mid-plane 164 wherein pairs of mirror-imaged unidirectional plies 180 of the inner sublaminate 156 and outer sublaminate 160 may be located at equal distances from the mid-plane 164 which may minimize deformation or warping during curing of the composite laminate 150. In the present disclosure, inner sublaminates 156 are located on an inboard side (i.e., nearest the cone inner surface 126—FIG. 4) of the cone-shaped composite article 114, and outer sublaminates 160 are located on an outboard side (i.e., nearest the cone outer surface 128—FIG. 4) of the cone-shaped composite article 114.

Figure 11:
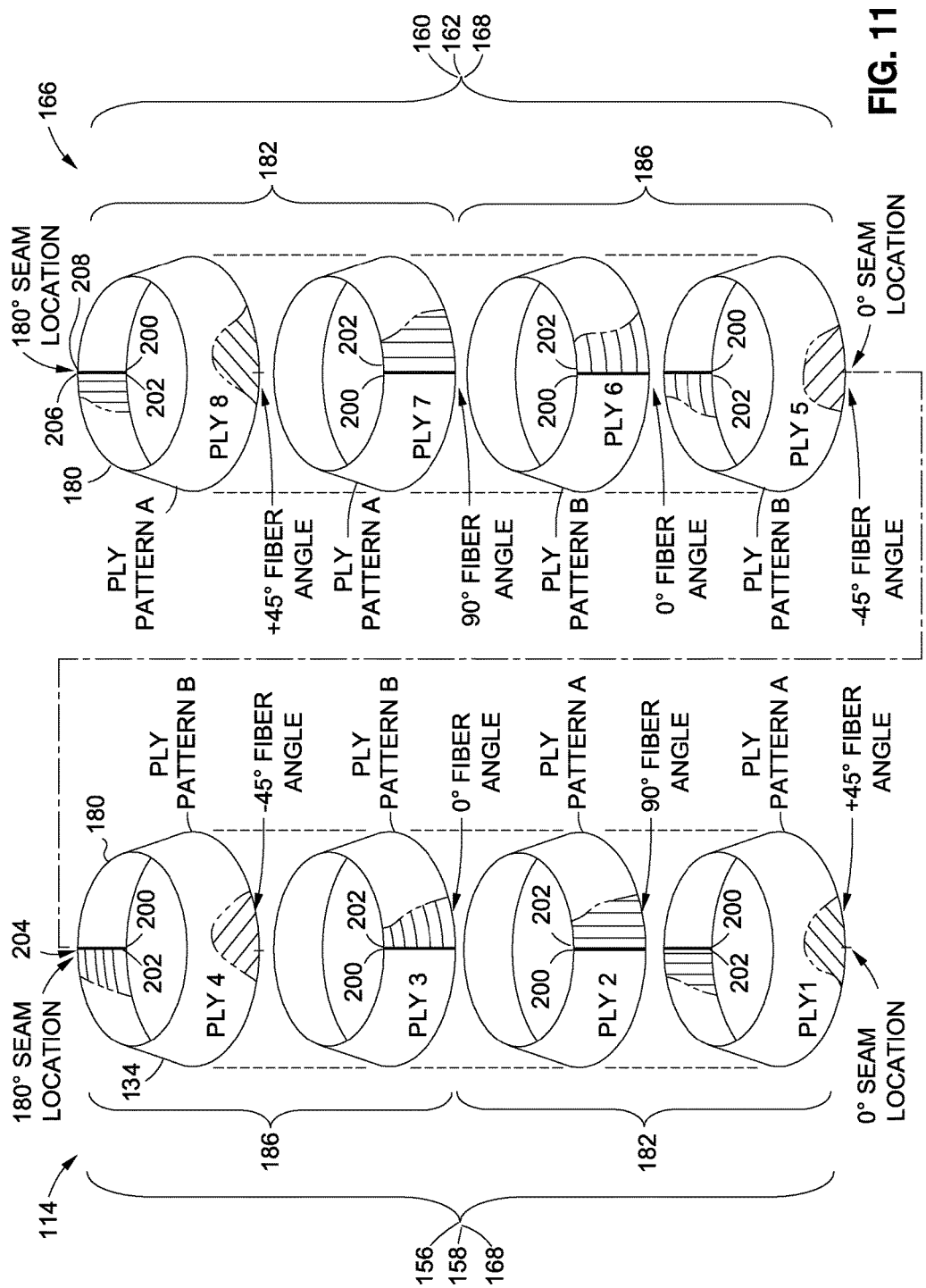
FIG. 11 is an exploded perspective illustration of the unidirectional plies that make up the inner sublaminate and the outer sublaminate.

In FIG. 9, shown is a chart illustrating an embodiment of a ply stacking sequence for the cone-shaped composite article 114 of FIG. 11. In FIG. 9, the ply numbering (e.g., Ply No.) column represents the stacking order of the unidirectional plies 180 starting with Ply 1 at the tool surface such as the mandrel surface 302 of the cone-shaped mandrel 300 illustrated in FIG. 19. In FIG. 9, the Ply Pattern column represents one of two ply patterns (e.g., ply pattern A or ply pattern B—FIGS. 13-14) that may implemented for forming unidirectional plies 180 for laying up the composite laminate 150. The Seam Location column refers to the seam diagram of FIG. 12 which illustrates the seam locations of the ply seams 204 for each unidirectional ply 180. The Fiber Angle column represents the fiber angles of the unidirectional plies 180 relative to one another at the 0-degree seam location on the cone-shaped composite article 114 of FIG. 11. At the 0-degree seam location in FIG. 11, the fiber angles for Ply 1 through Ply 8 is +45/90/0/−45/−45/0/90/+45, corresponding to the Fiber Angle column of FIG. 9.

In FIG. 9, the chart lists the stacking sequence of the inner sublaminate 156 which is comprised of a first pair of unidirectional plies 182, Ply 1 and Ply 2, and which may both be formed from ply pattern A using unidirectional ply material at the same fiber angle for Ply 1 and Ply 2. For example, FIG. 13 illustrates ply pattern A having a 90 degree fiber angle (i.e., relative to the reference end 202) for the first pair of unidirectional plies 182, Ply 1 and Ply 2. The chart of FIG. 9 also lists a second pair of unidirectional plies 186, Ply 3 and Ply 4, which may be formed from ply pattern B using unidirectional ply material having the same fiber angle for Ply 3 and Ply 4. For example, FIG. 13 illustrates ply pattern B having a 0 degree fiber angle (i.e., relative to the reference end 202) for the first pair of unidirectional plies 182, Ply 3 and Ply 4. The chart in FIG. 9 also lists the outer stacking sequence of the outer sublaminate 160 which is also comprised of a first pair of unidirectional plies 182 and a second pair of unidirectional plies 186 arranged in mirror-image to the first pair 182 and second pair 186 of unidirectional plies of the inner sublaminate 156 to provide a balanced layup 166 for the composite laminate 150.

In FIG. 10, shown is a fiber angle rosette 210 illustrating the sign convention for the fiber angles 154 of the quasi-isotropic layup pattern 168 (FIG. 9) in the present disclosure. The sign convention represents the relative fiber angle orientations when looking down on a unidirectional ply 180 (FIG. 9) applied to a tool. In the present disclosure, the tool may comprise a cone-shaped mandrel 300 as illustrated in FIG. 19. In an embodiment, the unidirectional plies 180 may be laid up in a manner such that at any location on the cone-shaped composite article 114 (FIG. 9), the relative fiber angles 154 may be maintained within an angular tolerance of up to approximately ±2 degrees for the 0/90/±45 fiber angles of the quasi-isotropic layup pattern 168 of the inner sublaminate 156 (FIG. 9) and the outer sublaminate 160 (FIG. 9).

In FIG. 11, shown is an exploded perspective illustration of the unidirectional plies 180 of the inner sublaminate 156 and the outer sublaminate 160 corresponding to the ply stacking sequence illustrated in FIG. 9. In FIG. 11, each one of the unidirectional plies 180 is continuous (except at a ply seam 204) along a ply arclength 190 (FIG. 13) wrapping 360-degrees around the cone-shaped composite article 114. Each one of the unidirectional plies 180 has opposing ply ends 200 that terminate at a ply seam 204. One of the ply ends 200 may comprise a reference end 202 (FIG. 13-14) which may comprise the ply end 200 by which the unidirectional ply 180 is aligned with a seam location prior to wrapping the unidirectional ply 180 around a cone-shaped mandrel 300 (FIG. 19) or over a previously-laid unidirectional ply 180. As indicated above, the ply seams 204 may be formed as ply butt joints 206 although one or more of the ply seams 204 may be formed as an overlap joint (not shown). In an embodiment, each one of the unidirectional plies 180 may be provided in a ply width 198 (FIG. 13) which may extend at least from an upper edge 118 (FIG. 5) of the cone-shaped composite article 114 (FIG. 5) to at least a lower edge 122 (FIG. 5) thereof. However, one or more of the unidirectional plies 180 may have a ply width 198 (FIG. 13) that extends above the upper edge 118 and/or below the lower edge 122 of the final cone-shaped composite article 114 during layup. Excess ply material above the upper edge 118 and/or below the lower edge 122 may be trimmed from the cone-shaped composite article 114 following cure.

In FIG. 11, the inner sublaminate 156 includes the first pair of unidirectional plies 182, Ply 1 and Ply 2, which are both formed using ply pattern A having a first fiber angle 184. The ply seams 204 of Ply 1 and Ply 2 are clocked 180 degrees relative to one another resulting in a 0/45 degree laminate. The inner sublaminate 156 also includes the second pair of unidirectional plies 186, Ply 3 and Ply 4, which are both formed using ply pattern B having a second fiber angle 188. In FIG. 14, the fiber angle 154 for ply pattern B is shown oriented at 90 degrees relative to the reference end 202. In FIG. 13, the fiber angle 154 for ply pattern A is shown oriented at of 0 degrees relative to the reference end 202. However, the fiber angle 154 of ply pattern A and ply pattern B may be oriented at any angle relative to the reference end 202, as long as the fiber angle 154 of ply pattern A is oriented at 90 degrees to the fiber angle 154 of ply pattern B.

In FIGS. 11-12, the ply seams 204 of the second pair of unidirectional plies 186, Ply 3 and Ply 4, are clocked 180 degrees relative to one another. In addition, the ply seams 204 of the second pair of unidirectional plies 186, Ply 3 and Ply 4, are aligned with the ply seams 204 of the first pair of unidirectional plies 182, Ply 1 and Ply 2, resulting in a quasi-isotropic layup for the inner sublaminate 156 as illustrated in FIG. 8. For example, at the 0-degree seam location, the inner sublaminate 156 from Ply 1 to Ply 4 has a quasi-isotropic layup pattern of +45/90/0/−45. As may be appreciated, the unidirectional plies 180 may be arranged to provide a different quasi-isotropic layup pattern 168. For example, the unidirectional plies 180 may be arranged to provide a 0/+45/90/−45 pattern, a +45/0/−45/−90 pattern, a −45/0/+45/90 pattern, and other patterns. The unidirectional plies 180 of the outer sublaminate 160 may be arranged in mirror-image to the unidirectional plies 180 of the inner sublaminate 156 as shown in FIG. 11 to provide a balanced layup 166 as indicated above.

In FIGS. 13-14, shown are the arcuate shapes 192 of ply pattern A and ply pattern B from which the unidirectional plies 180 may be formed. Ply pattern A and ply pattern B may be formed at the same dimensions such as the same inner radius 194, outer radius 196, ply width 198, and arcuate length between the ply ends 200. Each one of the ply patterns A and B represents a continuous arcuate shape 192 for forming the unidirectional plies 180 in flat pattern to wrap 360-degrees around a cone-shaped mandrel 300 such that opposing ply ends 200 of each unidirectional ply 180 may terminate at a ply seam 204 such as a ply butt joint 206 (FIG. 11). In addition, each one of the ply patterns A and B may be provided in a ply width 198 such that when a unidirectional ply 180 is laid up on the cone-shaped mandrel 300 (FIG. 19), the inner radius 194 of the arcuate shape 192 may be substantially aligned with the upper edge 118 (FIG. 5) of the cone-shape composite article, and the outer radius 196 of the arcuate shape 192 may be substantially aligned with the lower edge 122 (FIG. 5) of the cone-shape composite article 114. However, the unidirectional plies 180 may be formed at an inner radius 194 and an outer radius 196 that extend respectively above and below the upper and lower edges 118, 122 of the final cone-shape composite article 114, and the cone-shaped composite article 114 can be trimmed upper and lower edges 118, 122 after curing In FIGS. 13-14, the unidirectional plies 180 may be formed by cutting out unidirectional material in the flat pattern arcuate shape 192 of ply pattern A and ply pattern B. For example, the unidirectional plies 180 may be formed by cutting an arcuate shape 192 of ply pattern A or ply pattern B from a single, large piece of unidirectional material. Alternatively, the unidirectional plies 180 may be formed from a plurality of individual strips or courses 232 of unidirectional tape 230 arranged in side-by-side relation to one another. The unidirectional tape 230 may be available in a tape width 234 in the range of from approximately 1 to 20 inches or larger. In an embodiment, the unidirectional tape 230 may comprise pre-impregnated unidirectional tape such as pre-impregnated carbon fiber unidirectional tape 230 in a desired tape width 234.

Figure 20:
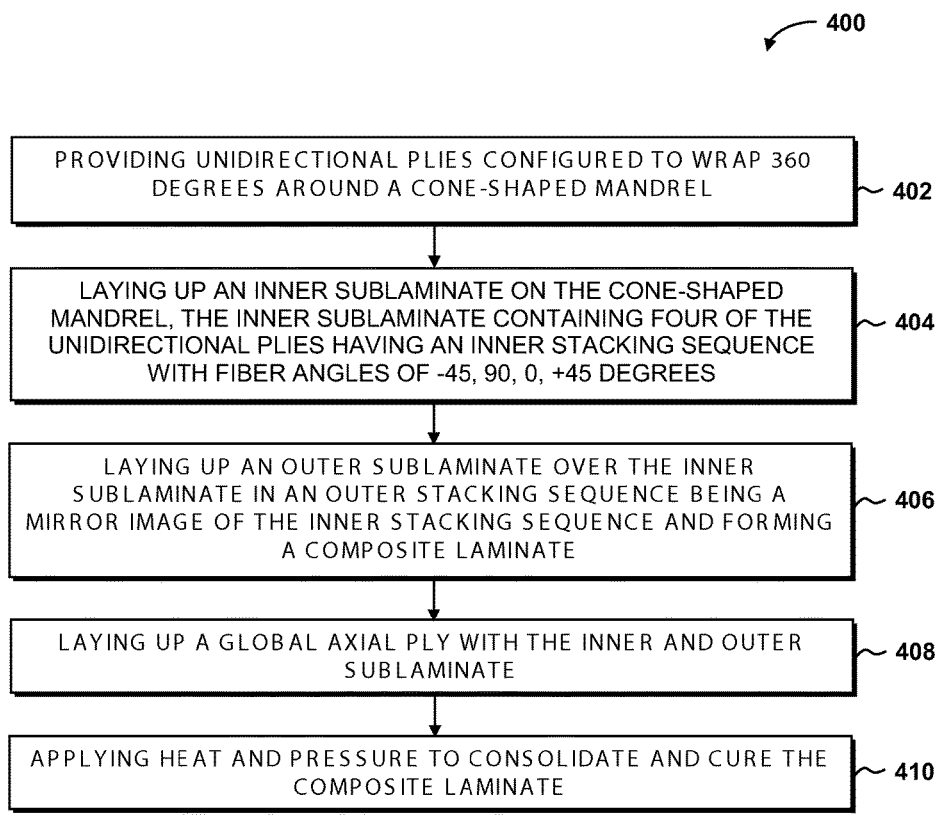
FIG. 20 is a flow chart illustrating a method of manufacturing a cone-shaped composite article.

In FIGS. 13-14, a plurality of courses 232 of unidirectional tape 230 are arranged in side-by-side relation so that the fiber angle 154 is parallel to the reference end 202 of the ply pattern A. For ply pattern B, the unidirectional tape 230 may be arranged so that the fiber angle 154 is perpendicular to the reference end 202 of the ply pattern B. The reference end 202 of each ply pattern A and B may comprise the ply end 200 by which the unidirectional ply 180 is aligned with the seam location on the cone-shaped mandrel 300 (FIG. 19). The side-by-side courses 232 of unidirectional tape 230 may be cut into the arcuate shape 192 of ply pattern A. The courses 232 of unidirectional tape 230 may be individually laid up by aligning the courses 232 with index marks that may be provided in the mandrel surface 302 (FIG. 20) for the seam location index marks 304 (FIG. 20), upper edge index mark 306 (FIG. 20), and/or lower edge index marks 308 (FIG. 20). The tape sides 236 of the courses 232 of unidirectional tape 230 may be positioned in side-by-side abutting (e.g., non-overlapping) relation to one another to form a complete, continuous, 360-degree unidirectional ply 180.

In an embodiment, the unidirectional plies 180 may be comprised of unidirectional material comprising fiber-reinforced polymer matrix material as indicated above. For example, the unidirectional material may comprise pre-impregnated composite material such as pre-impregnated unidirectional tape. However, the unidirectional material may also comprise dry fiber material (not shown) such as dry fiber preforms (not shown) that may be cut to the arcuate shapes of ply pattern A and B and laid up on a cone-shaped mandrel 300 followed by infusing the preforms with liquid resin in a separate step (not shown).

In an embodiment, the unidirectional material may comprise unidirectional fibers pre-impregnated with polymer matrix material. The polymer matrix material may comprise thermoplastic matrix material or thermosetting matrix material. The fibers may be formed of carbon, glass, aramid, metal, and/or any fiber material or combination thereof. In an embodiment, the unidirectional plies 180 may be provided as relatively thick, high-density, high-modulus, unidirectional carbon fibers pre-impregnated with polymer matrix material. For example, the unidirectional plies 180 may have a ply thickness of at least approximately 0.002 inch such as a thickness of approximately 0.020 inch. The unidirectional plies 180 may comprise unidirectional carbon fibers pre-impregnated with polymer matrix material and having a nominal cured ply thickness of approximately 0.010 inch.

As indicated above, the unidirectional plies 180 may include fibers having a relatively high modulus in the range of approximately $30-70 \times 10^6$ pounds per square inch (psi) which may provide the cone-shaped composite article 114 with relatively high stiffness in all directions. In addition, the unidirectional plies 180 may have a relatively high aerial density such as an aerial density of approximately 50-350 grams/square meter which, in combination with a relatively large thickness of approximately 0.020 inch, may minimize the total quantity of unidirectional plies 180 and global axial plies 250 (described below) required to achieve the necessary wall thickness 132 (FIG. 4) for supporting the loads to which the cone-shaped composite article 114 (FIG. 4) may be subjected during service. The use of pre-impregnated polymer matrix material instead of wet layup (e.g., resin-infused dry preforms) may allow for improved control over the fiber volume fraction in the final cone-shaped composite article 114. In an embodiment, the cone-shaped composite article 114 may be manufactured with a fiber volume fraction of between approximately 45-60 percent, such as between approximately 52-56 percent, although larger or smaller fiber volume fractions are contemplated.

In FIG. 15, shown is a chart of a ply stacking sequence for an embodiment of a cone-shaped composite article 114 (FIG. 11) having a plurality of balanced layups 166 (FIG. 11) to achieve a desired wall thickness 132 (FIG. 4). As indicated above, a balanced layup 166 comprises an inner sublaminate 156 having an inner stacking sequence 158 and an outer sublaminate 160 having an outer stacking sequence 162 in mirror-image to the inner stacking sequence 158. FIG. 15 illustrates three (3) balanced layups 166 comprising three (3) inner sublaminates 156 on one side of the mid-plane 164 (i.e., the mid-plane is between Ply 16 and Ply 17) and three (3) outer sublaminates 160 on an opposite side of the mid-plane 164. As indicated above, each inner sublaminate 156 and each outer sublaminate 160 include four (4) unidirectional plies 180 arranged to form a quasi-isotropic layup at any location on the cone-shaped composite article 114. For each balanced layup 166, the inner sublaminate 156 and the outer sublaminate 160 include ply seams 204 that are clocked 180 degrees relative to one another as described above and shown in FIG. 9. In FIG. 15, for a cone-shaped composite article 114 having multiple balanced layups 166, the ply seams 204 (FIG. 11) of the balanced layups 166 may be clocked at different seam locations around the circumference 134 of the cone-shaped composite article 114. Clocking of the seam locations of the balanced layups 166 may prevent the occurrence of multiple ply seams 204 at one location which may improve the stress distribution around the circumference 134 of the cone-shaped composite article 114.

In FIG. 15, in an embodiment, the cone-shaped composite article 114 may optionally include one or more global axial plies 250 to increase the axial strength and stiffness of the cone-shaped composite article 114 (FIG. 4). The global axial plies 250 may be formed of unidirectional material that may be similar to the unidirectional material used for the unidirectional plies 180 of the inner sublaminate 156 and outer sublaminate 160. The global axial plies 250 may be arranged such that the fiber angle 252 (FIG. 18) is generally aligned with the longitudinal axis 116 (FIG. 4) of the cone-shaped composite article 114. One or more global axial plies 250 may be laminated within an inner sublaminate 156 and within an outer sublaminate 160. For example, FIG. 15 illustrates two (2) global axial plies 250 laminated between Ply 1 and Ply 3 of the inner sublaminate 156 comprised of Ply 1, 4, 5, and 7, and another global axial ply 250 laminated between Ply 5 and Ply 7. To provide a balanced layup 166 (FIG. 11), the outer sublaminate 160 comprised of Ply 26, 28, 29, and 32 may have an equal number of global axial plies 250 laminated in mirror image to the global axial plies 250 in the inner sublaminate 156. The cone-shaped composite article 114 may optionally include one or more global axial plies 250 laminated between adjacently-disposed inner sublaminates 156 (e.g., Ply 8) and between adjacently-disposed outer sublaminates 160 (e.g., Ply 25) to provide a balanced layup 166. Although FIG. 15 illustrates eight (8) global axial plies 250, any number of global axial plies 250 may be provided in any arrangement within the sublaminates 156, 160 and/or between the sublaminates 156, 160.

Figure 16:
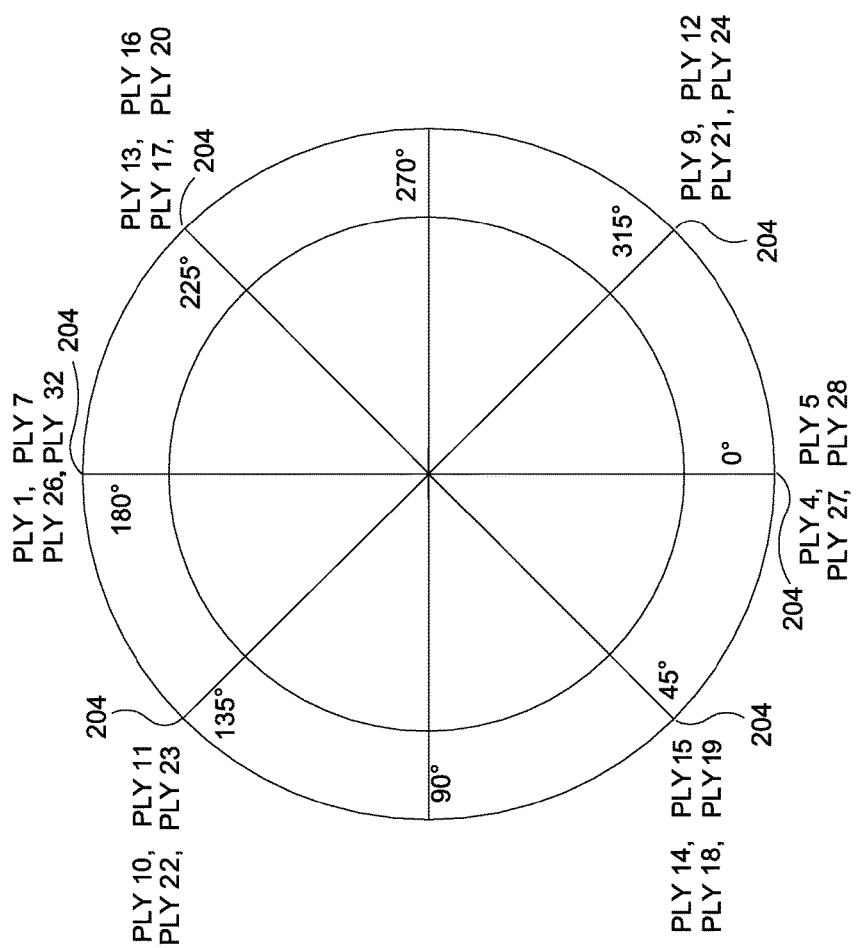
FIG. 16 is a diagrammatic view of the seam locations of the unidirectional plies for the embodiment of the cone-shaped composite article of FIG. 15.

In FIG. 16, shown is a diagram of seam locations of the inner and outer sublaminates 156, 160 for the cone-shaped composite article 114 represented in FIG. 15. The ply seam 204 locations may be equiangularly arranged (e.g., in 45-degree increments) to improve the strength characteristics of the cone-shaped composite article 114. As mentioned above, the clocking of the ply seams 204 avoids the occurrence of multiple ply seams 204 at one location and instead provides a staggered arrangement of ply seams 204. In this manner, the unidirectional plies 180 that overlap a ply butt joint 206 act as an overlap splice to interconnect the opposing ply ends 200 of the unidirectional ply 180. Although FIG. 16 illustrates an equiangular distribution of the ply seams 204, the ply seams 204 may be arranged in a non-equiangular manner.

Figures 17, 18:
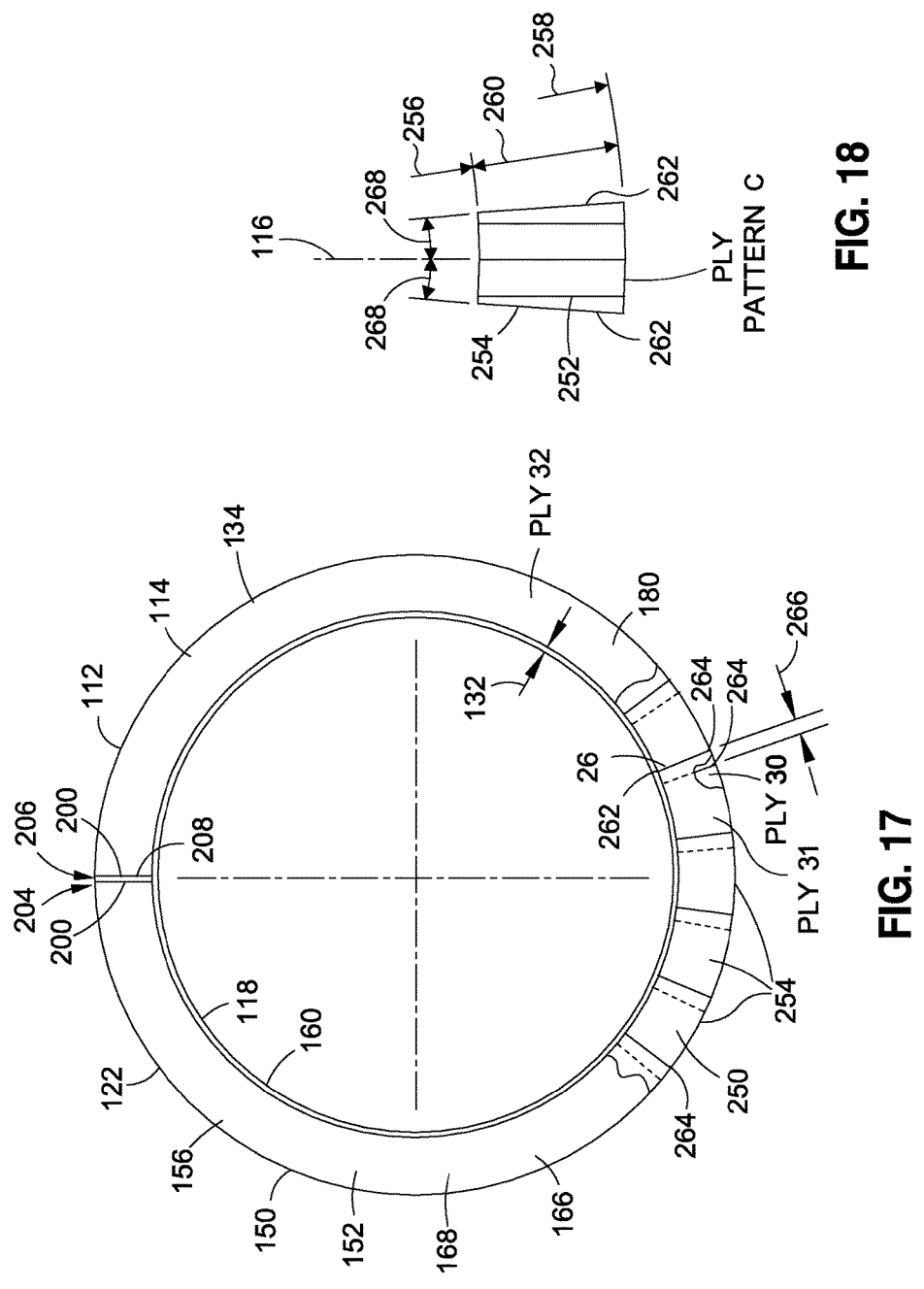

In FIG. 17, shown is a view looking downwardly at the cone-shaped composite article 114 and illustrating global axial plies 250 made up of a plurality of axial ply wedges 254. FIG. 17 illustrates Ply 32 which is partially cut away to show Ply 30 and Ply 31 which are global axial plies 250 laminated within the outer sublaminate 160. Each one of the global axial plies 250 may be comprised of a plurality of axial ply wedges 254 arranged in side-by-side relation to one another and extending 360-degrees around the cone-shaped composite article 114. Each one of the axial ply wedge 254 may have a fiber angle 252 (FIG. 18) that may be generally aligned (e.g., within ±10 degrees) of the longitudinal axis 116 (FIG. 18) of the cone-shaped composite article 114. The wedge sides 262 of adjacent axial ply wedges 254 may be positioned in abutting side-by-side relation to one another to form a plurality of wedge butt joints 264.

In FIG. 17, each global axial ply 250 may be overlapped by at least one continuous unidirectional ply 180 of an inner sublaminate 156 or of an outer sublaminate 160. The unidirectional ply 180 may act as an overlap splice for the wedge butt joints 264 and may interconnect the adjacently-disposed axial ply wedges 254. For example, Ply 32 is a unidirectional ply 180 overlapping global axial ply, Ply 31, such that Ply 32 may serve as an overlap splice to the wedge butt joints 264 of Ply 31. Although not shown, Ply 29 is also a unidirectional ply 180 that may serve as an overlap splice to the wedge butt joints 264 of global axial ply, Ply 30.

In FIG. 17, in an embodiment, the wedge butt joints 264 in each one of the global axial plies 250 may be staggered with the wedge butt joints 264 in one or more of the remaining global axial plies 250 to avoid the occurrence of two or more wedge butt joints 264 at one location on the cone-shaped composite article 114. For example, FIG. 17 illustrates the wedge butt joints 264 of Ply 30 being staggered with respect to the wedge butt joints 264 of Ply 31. In an embodiment, the wedge butt joints 264 in one or more of the global axial plies 250 may be positioned at a stagger 266 of at least 0.50 inch relative to the wedge butt joints 264 in one or more of remaining global axial plies 250, although the amount of stagger 266 may be less than 0.50 inch. In an embodiment, one or more of the wedge butt joints 264 in one of the global axial plies 250 may be generally aligned with one or more of the wedge butt joints 264 in other global axial plies 250.

In FIG. 18, shown is an embodiment of ply pattern C for forming an axial ply wedge 254. The ply pattern C has an inner radius 256 and an outer radius 258 defining a wedge height 260 of the axial ply wedge 254. In an embodiment, the wedge height 260 of the axial ply wedge 254 may be substantially equivalent to the ply width 198 (FIGS. 13-14) of ply pattern A (FIG. 13) and ply pattern B (FIG. 14). In this regard, the wedge height 260 of the axial ply wedge 254 may be sized to extend between the upper edge 118 (FIG. 17) and the lower edge 122 (FIG. 17) of the cone-shaped composite article 114. However, the axial ply wedges 254 may be provided in a wedge height 260 that extends above or below the upper edge 118 and/or lower edge 122 during layup of the axial ply wedges 254.

In FIG. 18, the axial ply wedges 254 may be provided in an arcuate length that minimizes the number of axial ply wedges 254 required to from a 360-degree global axial ply 250 (FIG. 17) around the cone-shaped composite article 114. However, the arcuate length may also be minimized to minimize the amount of misalignment of the fiber angles 252 on the sides of each axial ply wedge 254 with the longitudinal axis 116 (FIG. 17) of the cone-shaped composite article 114. By minimizing the misalignment of the fiber angles 252 on the sides of each axial ply wedge 254 with the longitudinal axis 116, the axial load-carrying capability and axial stiffness of the global axial ply 250 may be maximized. Each axial ply wedge 254 may be formed of unidirectional material which may be similar to the unidirectional material described above for the unidirectional plies 180. The fiber angle 252 of the unidirectional material may be generally aligned with a radius bisecting the arcuate length of ply pattern C. In an embodiment, the axial ply wedges 254 may be formed of unidirectional tape 230 wherein multiple strips or courses 232 (FIG. 13) of unidirectional tape 230 may be arranged in side-by-side relation in a manner similar to the above-described process of forming unidirectional plies 180 from unidirectional tape 230.

In FIG. 18, the axial ply wedges 254 may be configured such that the axial ply fiber angle 252 at the center of the axial ply wedge 254 is generally aligned (i.e., having a 0-degree fiber angle) relative to the longitudinal axis 116 of the cone-shaped composite article 114 (FIG. 17), and the opposing wedge sides 262 may be formed at a wedge angle of cut 268 of a maximum of 8 degrees. For example, the axial ply wedges 254 may be configured such that each one of the wedge sides 262 is formed at a wedge angle of cut 268 of approximately 5 degrees. By minimizing the wedge angle of cut 268, the offset (i.e., from vertical) of the axial ply fiber angle 252 at the wedge sides 262 may be minimized.

In FIG. 19, shown is an embodiment of a cone-shaped mandrel 300 for laying up unidirectional plies 180 and, optionally, global axial plies 250 (FIG. 17), around a circumference 134 of the cone-shaped mandrel 300. The cone-shaped mandrel 300 may be formed of a metallic material (e.g., steel, aluminum, Invar™) or composite material (e.g., graphite-epoxy) having compatible characteristics for forming and curing the cone-shaped composite article 114. The mandrel surface 302 may include index marks to facilitate the alignment of the unidirectional plies 180 and the global axial plies 250 with the upper edge 118 and lower edge 122 (FIG. 17), and for aligning the ply ends 200 of each unidirectional ply 180 with a predetermined seam location. The index marks may comprise scribe marks formed directly in the mandrel surface 302. For example, the cone-shaped mandrel 300 may include seam location index marks 304, upper edge index marks 306, and lower edge index marks 308, and which may be provided as scribe marks formed as indentations in the mandrel surface 302 or other means for marking the ply locations. FIG. 19 illustrates a unidirectional ply 180 with the reference end 202 tacked onto the mandrel surface 302 in alignment with the 0-degree seam location, and the unidirectional ply 180 wrapping around the cone-shaped mandrel 300 prior to tacking the remaining ply end 200 to the mandrel surface 302 back at the 0-degree seam location.

In FIG. 19, in an embodiment not shown, the index marks may be provided by a laser alignment system configured to project laser light at predetermined indexing locations onto the cone-shaped mandrel 300 or previously-laid plies. For example, such a laser alignment system may be configured to project the seam locations, upper edge 118, and lower edge 122 onto a cone-shaped mandrel 300 surface. In addition, such a laser alignment system may project the unidirectional ply 180 geometry, global axial ply 250 geometry, and stacking sequences onto the cone-shaped mandrel 300 or onto previously-laid unidirectional plies 180 or global axial plies 250 during the layup process to indicate the nominal position of each newly-applied unidirectional ply 180 and global axial ply 250.

In FIG. 20, shown is a flow chart illustrating a method 400 of manufacturing a cone-shaped composite article 114 as shown in FIG. 17. The method may include Step 402 comprising providing unidirectional plies 180 in a continuous arcuate shape 192 in a flat pattern configured to wrap 360-degrees around a cone-shaped mandrel 300. In an embodiment, the opposing ply end 200 of one or more unidirectional plies 180 terminate in a ply butt joint 206 although the ply ends 200 may overlap. The method may include forming at least one of the unidirectional plies 180 from a plurality of courses 232 of unidirectional tape 230 arranged in side-by-side relation to one another as mentioned above. The unidirectional plies 180 may be provided in a ply width 198 that extends at least from an upper edge 118 of the cone-shaped composite article 114 to at least a lower edge 122 thereof.

Step 404 of the method 400 of FIG. 20 may include laying up an inner sublaminate 156 on the cone-shaped mandrel 300. As described above, the inner sublaminate 156 advantageously contains at least four (4) unidirectional plies 180 having an inner stacking sequence 158 with fiber angles of 0, 90, +45, −45 degrees. The fiber angles may be arranged in different orders (e.g., 0/+45/90/−45, 0/−45/90/+45, 90/+45/0/−45, −45/0/90/+45, etc.) in the 4-ply inner sublaminate 156. The 4-ply inner sublaminate 156 may be arranged to provide a quasi-isotropic layup pattern 168 by providing a first pair of unidirectional plies 182 each having a first fiber angle 184, clocking the ply seams 204 of the first pair of unidirectional plies 182 at 180 degrees relative to one another, providing a second pair of unidirectional plies 186 each having a second fiber angle 188 oriented 90 degrees relative to the first fiber angle 184, and clocking the ply seams 204 of the second unidirectional plies 180 degrees relative to one another around the circumference 134 of the cone-shaped composite article and in alignment with the ply seams 204 of the first pair of unidirectional plies 182 as shown in FIGS. 5-6 and 11.

As indicated above, such additional 4-ply quasi-isotropic layup patterns 168 are preferably arranged in a symmetric and balanced layup 166 about a mid-plane 164 of the composite laminate 150. For example, as illustrated in FIG. 15, for each inner sublaminate 156, an outer sublaminate 160 is provided on an opposite side of the mid-plane 164 with the corresponding outer sublaminate 160 having an outer stacking sequence 162 that is a mirror-image of the inner stacking sequence 158 of the inner sublaminate 156. As illustrated in FIG. 15, it not necessary that each inner sublaminate 156 and corresponding outer sublaminate 160 are located adjacent to one another. In this regard, each set of inner and outer sublaminates 156, 160 are symmetric about the mid-plane 164 such the unidirectional plies 180 of each inner sublaminate 156 are located at the same distance from the mid-plane 164 as the unidirectional plies 180 of the corresponding outer sublaminate 160. In this manner, a composite laminate 150 is provided in a symmetric and balanced layup 166 which may minimize warpage of the composite laminate 150 following cure.

In an embodiment, the inner sublaminate 156 may be formed by laying up the arcuate shape 192 of each one of the unidirectional plies 180 so that the ply ends 200 are aligned with a seam location index mark 304 on the cone-shaped mandrel 300 as shown in FIG. 19. In an embodiment, the ply butt joint 206 of each one of the unidirectional plies 180 may be provided with a gap 208 of less than approximately 0.10 inch between the ply ends 200. In addition, the process of laying up the arcuate shape 192 of each one of the unidirectional plies 180 may include vertically aligning an inner radius 194 and outer radius 196 of the arcuate shape 192 with an upper edge index mark 306 and a lower edge index mark 308 on the cone-shaped mandrel 300. The process of laying up the unidirectional plies 180 may be performed manually and/or with an automated fiber placement machine (not shown).

Step 406 of the method 400 of FIG. 20 may include laying up an outer sublaminate 160 over the inner sublaminate 156 in an outer stacking sequence 162 that is a mirror image of the inner stacking sequence 158. The ply seams 204 of the outer sublaminate 160 may be aligned with the ply seams 204 of the inner sublaminate 156. As indicated above, each one of the inner sublaminate 156 and the outer sublaminate 160 represents a quasi-isotropic layup at any location on the composite article. The combination of the inner sublaminate 156 and the outer sublaminate 160 comprises a composite laminate 150 having a balanced layup 166 and symmetrical layup as described above to minimize warpage of the composite laminate 150 following cure.

The method of manufacturing a cone-shaped composite article 114 may include applying a plurality of balanced layups 166 (FIG. 11) 166 to achieve a desired wall thickness 132 to accommodate the loads to which the cone-shaped composite article 114 may be subjected during service. As indicated above, each one of the balanced layups 166 may comprise an inner sublaminate 156 paired with an outer sublaminate 160. The outer sublaminate 160 may be provided as a mirror image of the inner sublaminate 156. For a composite laminate 150 having multiple balanced layups 166, the composite laminate may include a plurality of inner sublaminates 156 each being paired with an outer sublaminate 160 located on an opposite side of the mid-plane 164 from the corresponding inner sublaminate 156. As indicated above, each one of the outer sublaminates 160 may have a quasi-isotropic outer stacking sequence 162 that is a mirror image of the quasi-isotropic inner stacking sequence 158 of the corresponding inner sublaminate 156 located on the opposite side of the mid-plane 164.

Step 408 of the method 400 of FIG. 20 may include laying up one or more global axial plies 250 with the one or more balanced layups 166. For example, one or more global axial plies 250 that may be laminated between the unidirectional plies 180 of the inner sublaminate 156 and the outer sublaminate 160. The step of laying up global axial plies 250 may comprise laying up a plurality of axial ply wedges 254 in side-by-side relation to one another to form a plurality of wedge butt joints 264 as shown in FIG. 17 such that the axial ply wedges 254 extend 360-degrees around the cone-shaped mandrel 300 to form a global axial ply 250.

The axial ply wedges 254 may be formed in a flat pattern geometry such as the geometry of ply pattern C (FIG. 18). The fiber angles 252 of each axial ply wedge 254 may be generally aligned with the longitudinal axis 116 of the cone-shaped composite article 114. The global axial plies 250 may add to the axial strength and stiffness of the cone-shaped composite article 114. For a cone-shaped composite article 114 having multiple global axial plies 250, the method may include staggering the wedge butt joints 264 in each one of the global axial plies 250 by at least 0.50 inch relative to the wedge butt joints 264 in remaining ones of the global axial plies 250 to avoid multiple wedge butt joints 264 at any one location.

Step 410 of the method 400 of FIG. 20 may include applying heat and/or pressure to the composite laminate 150 to consolidate and cure the composite laminate 150. For example, following layup, the composite laminate 150 may be vacuum bagged to debulk and consolidate the unidirectional plies 180. Heat may be applied to the composite laminate 150 such as by positioning the composite laminate 150 inside an autoclave or oven. The heat may increase the temperature of the matrix material and reduce the viscosity thereof allowing the matrix material in adjacent unidirectional plies 180 to intermingle. Heat may be removed and the composite laminate 150 may be allowed to cool and cure or solidify, resulting in the final cone-shaped composite article 114.

Although not shown, the present disclosure also contemplates a cone-shaped composite article configured as a sandwich composite structure instead of a solid composite laminate described above. Such a sandwich composite structure may include at least one inner sublaminate having an inner stacking sequence located on one side of a core, and an outer sublaminate located on an opposite side of the core and having an outer stacking sequence that is a mirror image of the inner stacking sequence to provide a balanced layup. The core material may comprise a foam core, a honeycomb core of aluminum, aramid, etc., or other core configurations and materials. The inner and outer sublaminates of such a sandwich composite structure may be fabricated according to the disclosure above.

A significant advantage of the presently disclosed system and method is the ability to fabricate the cone-shaped composite article 114 without the need for darts or overlap splices. As indicated above, the use of ply patterns extending in a continuous 360-degree wrap around the cone circumference minimizes or eliminates the need for darts to conform to the cone geometry. In addition, the use of ply butt joints 206 and the avoidance of overlap splices significantly reduces the potential for the occurrence of wrinkles or voids in the cone-shaped composite article 114. Furthermore, the use of butt joints throughout the cone-shaped composite article 114 may result in a ply layup that does not vary by more than approximately ±10% of the wall thickness 132 which may improve the specific strength of the cone-shaped composite article 114 relative to a conventional layup with wall thickness variations greater than ±10%. The combination of the above-noted factors advantageously results in a relatively light-weight, high-strength, and high—stiffness cone-shaped composite article 114 capable of transmitting a variety of loads of different direction and magnitude such as the axial loads 106, bending loads 108, and torsional loads 110 (FIG. 1) transmitted by a conical payload attach fitting 112 (FIG. 1) coupling a spacecraft 104 (FIG. 1) to a launch vehicle 100 (FIG. 1).

Figure 21:
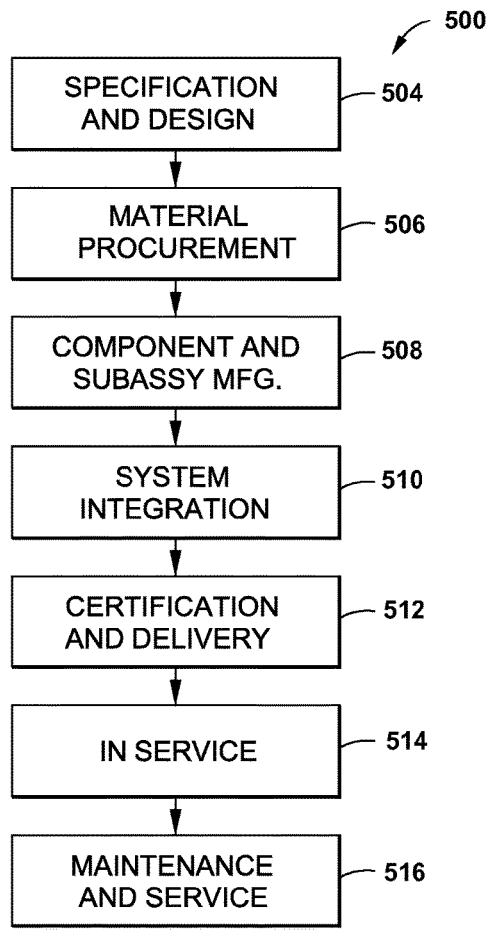
FIG. 21 is a flow diagram illustrating an aircraft manufacturing and service methodology.
Figure 22:
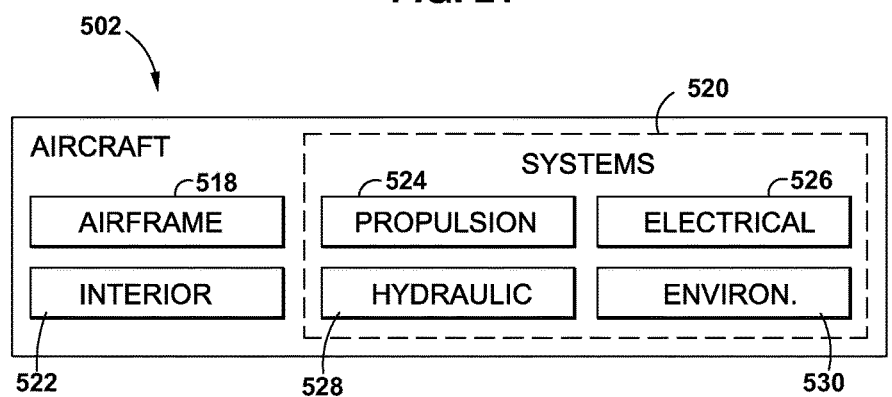
FIG. 22 is a block diagram of an aircraft.

Referring to FIGS. 21-22, embodiments of the disclosure may be described in the context of an aircraft manufacturing and service method 500 as shown in FIG. 21 and an aircraft 502 as shown in FIG. 22. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 22, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the disclosure may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a cone-shaped composite article, comprising the steps of:
   providing unidirectional plies in a continuous arcuate shape in a flat pattern configured to wrap 360 degrees around a cone-shaped mandrel such that opposing ply ends of each unidirectional ply terminate at a ply seam;
   laying up at least one inner sublaminate on the cone-shaped mandrel, the inner sublaminate containing at least four of the unidirectional plies having an inner stacking sequence with fiber angles of −45, 90, 0, +45 degrees such that the inner sublaminate has a quasi-isotropic layup at any location of the inner sublaminate;
   laying up at least one outer sublaminate in an outer stacking sequence being a mirror image of the at least one inner stacking sequence; and
   the ply seam of at least two of the plies being clocked at different locations around a circumference of the cone-shaped composite article.

2. The method of claim 1, wherein the steps of laying up the inner sublaminate and the outer sublaminate each include:
   providing a first pair of unidirectional plies each having a first fiber angle;
   clocking the ply seams of the first pair of unidirectional plies 180 degrees relative to one another around a circumference of the cone-shaped composite article;
   providing a second pair of unidirectional plies each having a second fiber angle oriented 90 degrees relative to the first fiber angle; and
   clocking the ply seams of the second unidirectional plies 180 degrees relative to one another and in alignment with the ply seams of the first pair of unidirectional plies.

3. The method of claim 1, further comprising:
   laying up the unidirectional plies such that the ply seam of at least one of the unidirectional plies forms a ply butt joint.

4. The method of claim 3, wherein:
   a gap between opposing ply ends of the ply butt joint in at least one of the unidirectional plies is less than approximately 0.10 inch.

5. The method of claim 1, further comprising:
   laying up each one of the unidirectional plies by aligning a ply end of the arcuate shape with a seam location index mark on the cone-shaped mandrel.

6. The method of claim 1, further comprising:
   vertically aligning at least one of an inner radius and an outer radius of the arcuate shape with respective ones of an upper edge index mark and a lower edge index mark on the cone-shaped mandrel.

7. The method of claim 1, further comprising:
   laying up a plurality of balanced layups; and
   each one of the balanced layups comprising an inner sublaminate paired with an outer sublaminate being a mirror image of the inner sublaminate.

8. The method of claim 1, further comprising:
   forming at least one of the unidirectional plies from a plurality of courses of unidirectional tape arranged in side-by-side relation to one another.

9. The method of claim 1, further comprising:
   laying up a plurality of axial ply wedges in side-by-side relation and extending 360 degrees around the cone-shaped mandrel to form a global axial ply having fiber angles being generally aligned with a longitudinal axis of the cone-shaped composite article.

10. The method of claim 9, wherein the step of laying up the plurality of axial ply wedges includes:
    laying up the plurality of axial ply wedges to form a plurality of wedge butt joints; and
    staggering the wedge butt joints in each one of the global axial plies relative to the wedge butt joints in one or more remaining ones of the global axial plies.

11. The method of claim 9, wherein:
    the axial ply wedges each having a wedge height being substantially equivalent to a ply width.

12. The method of claim 9, further comprising:
    vertically aligning at least one of an inner radius and an outer radius of the axial ply wedges with respective ones of an upper edge index mark and a lower edge index mark on the cone-shaped mandrel.

13. The method of claim 9, wherein:
    the axial ply wedges are formed of unidirectional material.

14. The method of claim 1, wherein:
    the unidirectional plies are comprised of pre-impregnated composite plies.

15. A method of manufacturing a cone-shaped composite article, comprising the steps of:
    providing unidirectional plies in a continuous arcuate shape in a flat pattern configured to wrap 360 degrees around a cone-shaped mandrel such that opposing ply ends of each unidirectional ply terminate at a ply seam forming a ply butt joint;
    laying up at least one inner sublaminate on the cone-shaped mandrel, the inner sublaminate containing at least four of the unidirectional plies having an inner stacking sequence with fiber angles of −45, 90, 0, +45 degrees such that the inner sublaminate defines a quasi-isotropic layup pattern at any location of the inner sublaminate, an orientation of the quasi-isotropic layup pattern continuously changing in a spiraling manner along a circumferential direction of the cone-shaped composite article; and
    laying up at least one outer sublaminate in an outer stacking sequence being a mirror image of the at least one inner stacking sequence wherein a quantity and fiber angles of the unidirectional plies on one side of a through-thickness mid-plane of the composite article are equal to and in reverse order to a quantity and fiber angles of the unidirectional plies on an opposite side of the through-thickness mid-plane; and
    the ply seam of at least two adjacent unidirectional plies of at least one of the inner sublaminate and outer sublaminate being clocked at different locations around a circumference of the cone-shaped composite article.

16. The method of claim 15, wherein the steps of laying up the inner sublaminate and the outer sublaminate each include:
  providing a first pair of unidirectional plies each having a first fiber angle;
  clocking the ply seams of the first pair of unidirectional plies 180 degrees relative to one another around a circumference of the cone-shaped composite article;
  providing a second pair of unidirectional plies each having a second fiber angle oriented 90 degrees relative to the first fiber angle; and
  clocking the ply seams of the second unidirectional plies 180 degrees relative to one another and in alignment with the ply seams of the first pair of unidirectional plies.

17. The method of claim 15, further comprising:
  laying up the unidirectional plies such that the ply seam of at least one of the unidirectional plies forms a ply butt joint.

18. The method of claim 15, further comprising:
  laying up a plurality of axial ply wedges in side-by-side relation and extending 360 degrees around the cone-shaped mandrel to form a global axial ply having fiber angles being generally aligned with a longitudinal axis of the cone-shaped composite article.

19. The method of claim 15, wherein:
  the unidirectional plies are comprised of pre-impregnated composite plies.

20. A method of manufacturing a cone-shaped composite article, comprising the steps of:
  providing pre-impregnated unidirectional plies in a continuous arcuate shape in a flat pattern configured to wrap 360 degrees around a cone-shaped mandrel such that opposing ply ends of each unidirectional ply terminate at a ply seam;
  laying up an inner sublaminate on the cone-shaped mandrel, the inner sublaminate containing four of the unidirectional plies having an inner stacking sequence with fiber angles of −45, 90, 0, +45 degrees such that the inner sublaminate has a quasi-isotropic layup at any location of the inner sublaminate;
  laying up an outer sublaminate over the inner sublaminate, the outer sublaminate containing four of the unidirectional plies having an outer stacking sequence in an outer stacking sequence being a mirror image of the inner stacking sequence with fiber angles of −45, 90, 0, +45 degrees such that the outer sublaminate has a quasi-isotropic layup at any location of the outer sublaminate;
  laying up a plurality of axial ply wedges in side-by-side relation to form at least one global axial ply having fiber angles being generally aligned with a longitudinal axis of the cone-shaped mandrel; and
  applying heat and pressure to the inner sublaminate, the outer sublaminate, and the global axial ply until cured together to form the cone-shaped composite article.

* * * * *